(12) United States Patent  
Lin

(10) Patent No.: US 8,405,765 B2
(45) Date of Patent: Mar. 26, 2013

(54) PORTABLE ELECTRONIC DEVICE WITH ROTATABLE CAMERA MODULE

(75) Inventor: Tsung-Yu Lin, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 371 days.

(21) Appl. No.: 12/722,510

(22) Filed: Mar. 11, 2010

(65) Prior Publication Data

US 2011/0043685 A1 Feb. 24, 2011

(30) Foreign Application Priority Data

Aug. 19, 2009 (CN) .......................... 2009 1 0305772

(51) Int. Cl.
*H04N 5/225* (2006.01)
(52) U.S. Cl. ...................................................... 348/373
(58) Field of Classification Search .................. 348/373, 348/376, 368, 374
See application file for complete search history.

(56) References Cited

U.S. PATENT DOCUMENTS

| | | | | |
|---|---|---|---|---|
| 5,801,919 A | * | 9/1998 | Griencewic | 361/679.26 |
| 6,141,052 A | * | 10/2000 | Fukumitsu et al. | 348/373 |
| 6,639,625 B1 | * | 10/2003 | Ishida et al. | 348/218.1 |
| 6,930,725 B1 | * | 8/2005 | Hayashi | 348/373 |
| 7,256,987 B2 | * | 8/2007 | Weng | 361/679.55 |
| 7,268,806 B2 | * | 9/2007 | Shimizu | 348/221.1 |
| 7,324,152 B2 | * | 1/2008 | Yoon | 348/360 |
| 7,411,616 B2 | * | 8/2008 | Shimizu | 348/229.1 |
| 7,443,446 B2 | * | 10/2008 | Seo | 348/375 |
| 7,570,485 B2 | * | 8/2009 | Krah | 361/679.23 |
| 7,611,294 B2 | * | 11/2009 | Shi et al. | 396/428 |
| 7,656,460 B2 | * | 2/2010 | Wernersson | 348/374 |
| 7,733,417 B2 | * | 6/2010 | Chang | 348/373 |
| 2009/0051776 A1 | * | 2/2009 | Wernersson | 348/208.12 |
| 2011/0013076 A1 | * | 1/2011 | Ko | 348/373 |

* cited by examiner

*Primary Examiner* — Sinh Tran
*Assistant Examiner* — Selam Gebriel
(74) *Attorney, Agent, or Firm* — Altis Law Group, Inc.

(57) ABSTRACT

A portable electronic device includes a main body, a number of ball bearings, a spherical retaining member and a camera module. The main body includes a cavity formed therein, and a number of recesses formed in inner walls of the cavity and in communication with the cavity. The ball bearings are received in the respective recesses. The spherical retaining member is located in the cavity and is in contact with the ball bearings. The spherical retaining member defines a receiving space therein and an opening in communication with the receiving space. The camera module is received in the receiving space and facing the opening, the camera module is retained by the spherical retaining member in a manner such that the camera module is rotated by rotating the spherical retaining member relative to the ball bearings.

17 Claims, 4 Drawing Sheets

PORTABLE ELECTRONIC DEVICE WITH ROTATABLE CAMERA MODULE

BACKGROUND

1. Technical Field

The present disclosure relates to portable electronic devices, and particularly to a portable electronic device having camera module mounted therein.

2. Description of Related Art

With the ongoing development of microcircuitry and multimedia technology, camera modules are more commonly used in portable electronic devices, such as note books.

However, usually such camera modules cannot be rotated without the portable electronic device itself being rotated. Thus, the object range is limited.

What is needed, therefore, is a portable electronic device which can overcome the above shortcomings.

BRIEF DESCRIPTION OF THE DRAWINGS

Many aspects of the present portable electronic device can be better understood with reference to the following drawings. The components in the drawings are not necessarily drawn to scale, the emphasis instead being placed upon clearly illustrating the principles of the present portable electronic device. Moreover, in the drawings, like reference numerals designate corresponding parts throughout the several views.

DETAILED DESCRIPTION OF THE EMBODIMENTS

Embodiments of the present portable electronic device will now be described in detail below and with reference to the drawings.

Figure 1:
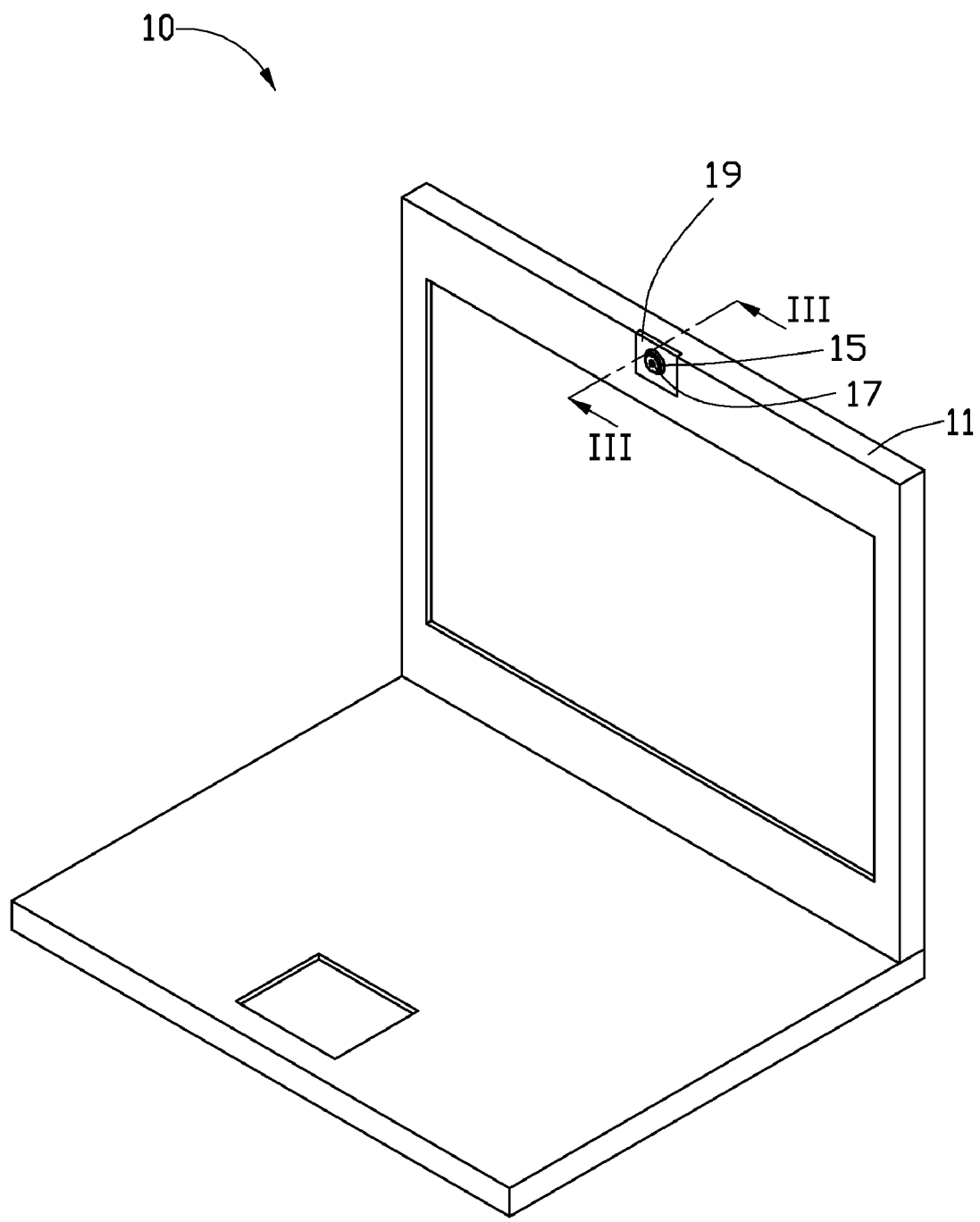
FIG. 1 is a schematic view of a portable electronic device in accordance with a first embodiment.
Figure 2:
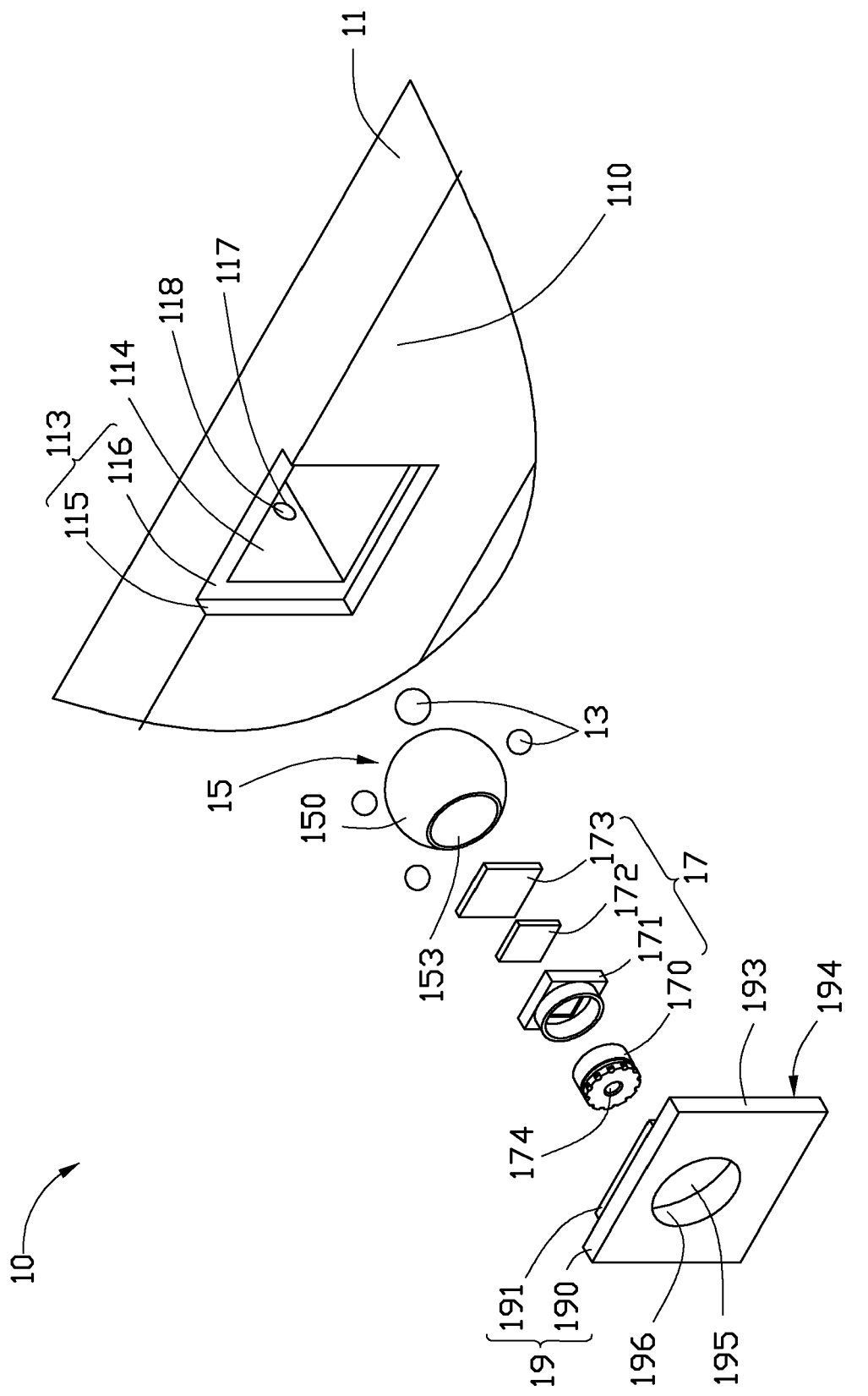
FIG. 2 is a partially exposed view of the portable electronic device shown in FIG. 1.
Figure 3:
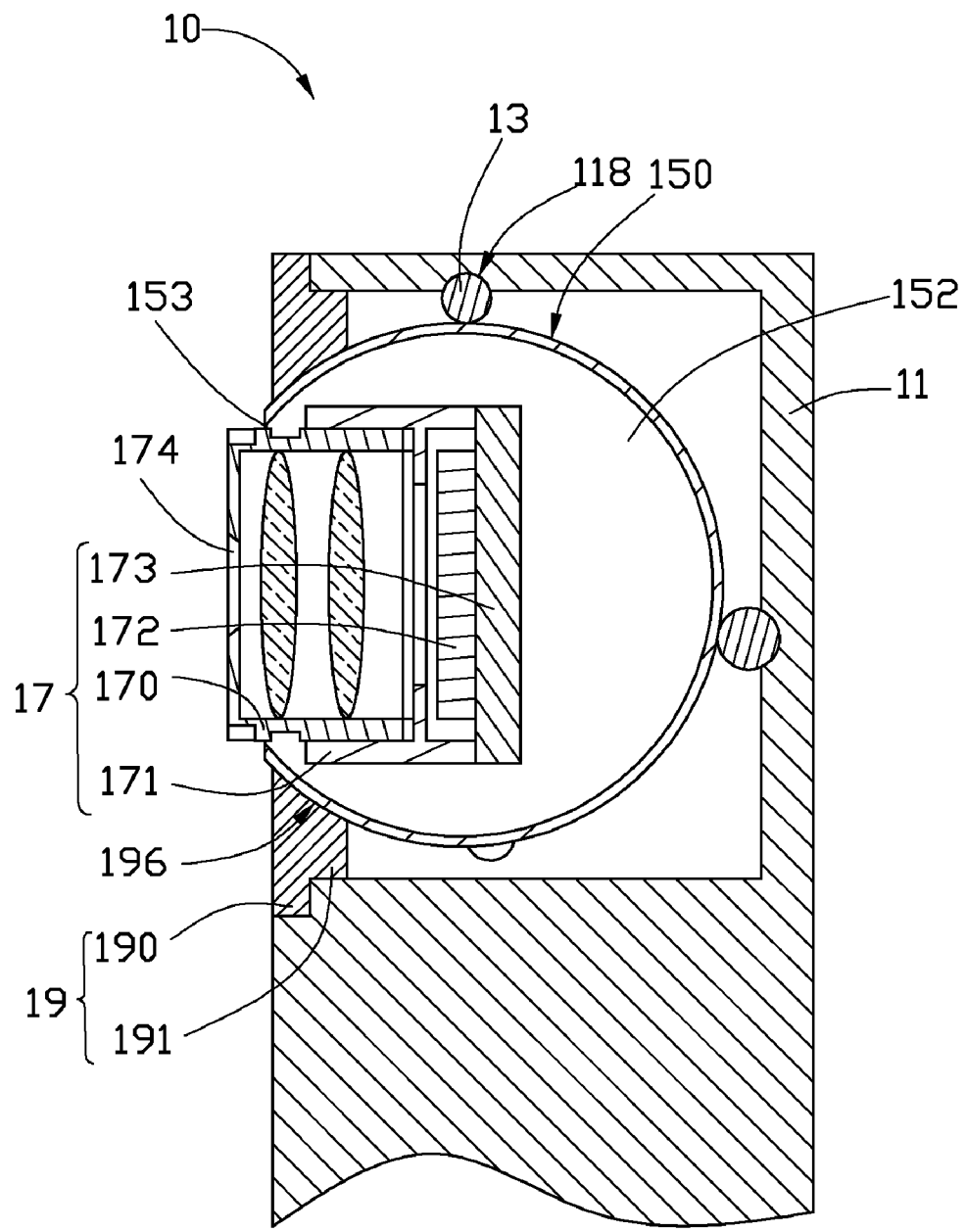
FIG. 3 is a cross sectional view of the portable electronic device of FIG. 1, taken along the line III-III.

Referring to FIGS. 1 to 3, a portable electronic device 10 in accordance with a first embodiment, is shown. The portable electronic device 10 is a note book, and includes a main body 11, a number of ball bearings 13, a hollow spherical retaining member 15, a camera module 17, and a cover 19. The ball bearings 13 need not be of uniform sizes.

The main body 11 includes a frame, and the frame has a surface 110 facing operating side of the main body 11. The surface 110 includes a cavity 114 formed therein, and a cutout 113 formed at an opening of the cavity 114 at the surface 110 and in communication with the cavity 114. In the illustrated embodiment, both the cavity 114 and the cutout 113 are square, and the cutout 113 includes a bottom surface 116 parallel with the surface 110, and three side surfaces 115 connecting the bottom surface 116 to the surface 110. A number of recesses 117 are formed in inner walls of the cavity 114, for partially receiving the ball bearings 13 therein, respectively. In the illustrated embodiment, the inner surface 118 of each of the recesses 117 is also spherical to contact with the outer spherical surface of each of the ball bearings 13.

The spherical retaining member 15 is disposed in the cavity 114 and is supported by ball bearings 13, with the outer spherical surface 150 of the spherical retaining member 15 in contact with the outer spherical surfaces of the ball bearings 13. The spherical retaining member 15 has a spherical inner space 152 and an opening 153 facing users.

The cover 19 includes a square first portion 190 and a square second portion 191 extending from the first portion 190. The second portion 191 is narrower than the first portion 190, and the first portion 190 includes a bottom surface 194 and four side surfaces 193. A through hole 195 is formed through the first portion 190 and the second portion 191, and the inner surface 196 of the through hole 195 is spherical. The second portion 191 is inserted in the cavity 114, with side surfaces thereof in contact with the inner walls of the cavity 114. The first portion 190 is engaged in the cutout 113, with the bottom surface 194 thereof in contact with the bottom surface 116 of the cutout 113, and three of the side surfaces 193 in contact with the three side surfaces 115. The last side surface 193 is unencumbered, i.e., is exposed to outside, thus facilitating the entire cover 19 to be mounted to the main body 11 or to be taken down from the main body 11. The inner surface 196 is in contact with the outer spherical surface 150 of the spherical retaining member 15. The opening 153 of the spherical retaining member 15 extends a little through the through hole 195, thus facilitating rotating the spherical retaining member 15 from outside without opening the cover 19.

The camera module 17 is received in the spherical inner space 152 and is retained by the spherical retaining member 15 with the lens module 170 in contact with the inner wall of the opening 153. The camera module 17 mainly includes a lens module 170, a holder 171, an image sensor 172, and a circuit board 173. The image sensor 172 and the holder 171 are mounted to the circuit board 173, and the lens module 170 is mounted to the holder 171. An aperture member 174 is mounted to the lens module 170. The camera module 17 can be electrically connected to the main body 11 via infrared light or by a cable extended through holes (not shown) formed in the spherical retaining member 15.

In application, the spherical retaining member 15 can be rotated due to the contact between the spherical retaining member 15 and the ball bearings 13, thus resulting in being able to rotate the camera module 17 relative to the main body 11 of the electronic device 10. In this way, the camera module 17 is more easily aimed at object according to need.

Figure 4:
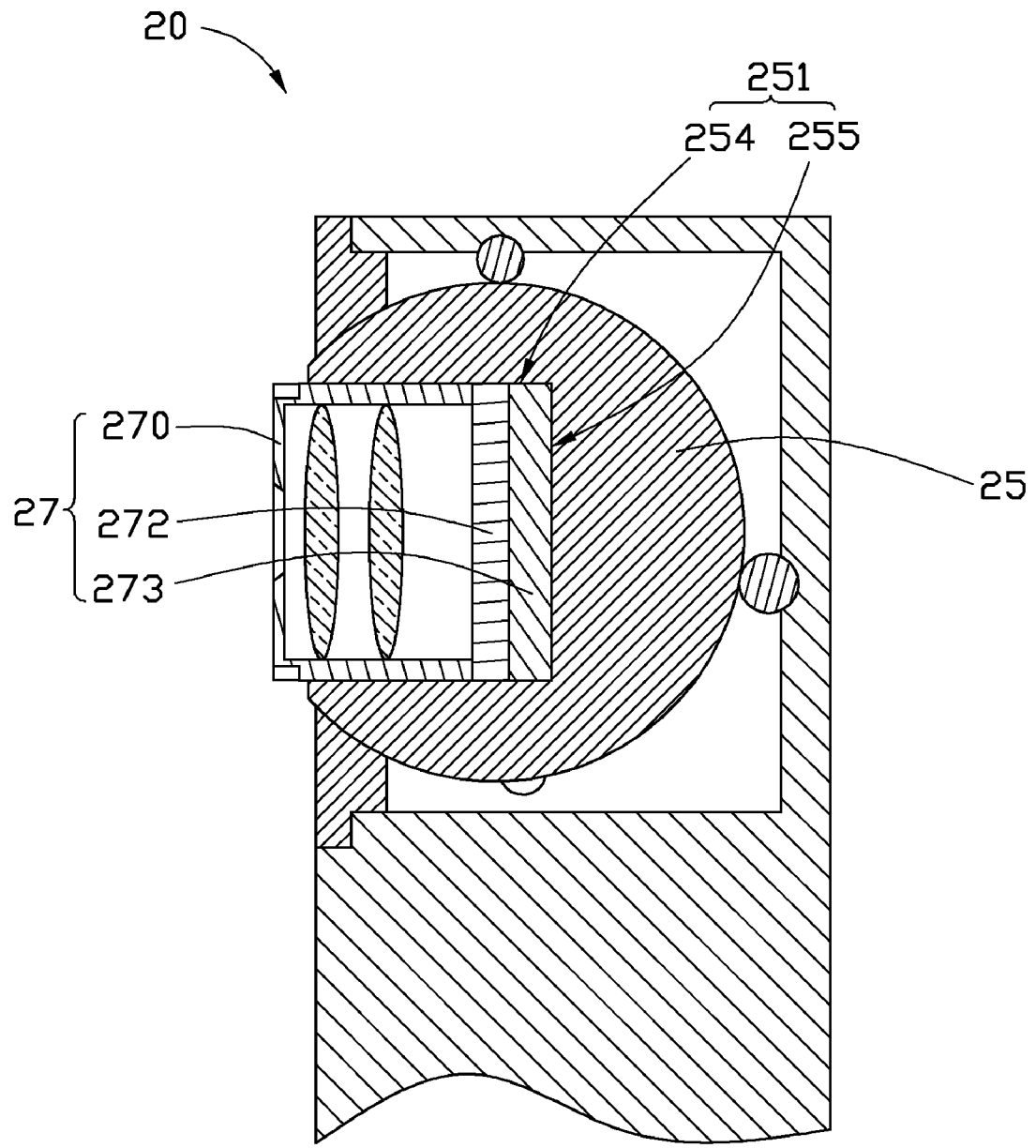
FIG. 4 is a cross sectional view of a portable electronic device in accordance with a second embodiment.

FIG. 4 shows a portable electronic device 20 in accordance with a second embodiment. The portable electronic device 20 is essentially similar to the portable electronic device 10 illustrated above, however, a spherical retaining member 25 having a cavity 251 is provided. A camera module 27 which includes a lens module 270, an image sensor 272 and a circuit board 273 is received in the cavity 251. The spherical retaining member 25 is configured as a holder for the camera module 27, with the bottom of the circuit board 273 in contact with a bottom 255 of the cavity 251, and side surfaces of the camera module 27 in contact with side surfaces 254 of the cavity 251.

It is understood that the above-described embodiments are intended to illustrate rather than limit the disclosure. Variations may be made to the embodiments and methods without departing from the spirit of the disclosure. Accordingly, it is appropriate that the appended claims be construed broadly and in a manner consistent with the scope of the disclosure.

What is claimed is:

1. A portable electronic device comprising:
   a main body comprising a main surface, a cavity formed in the main body, a plurality of recesses formed in inner walls of the cavity and in communication with the cavity, and a cutout formed in the main surface and in communication with the cavity, the cutout comprising a bottom surface parallel with the main surface and three side surfaces connecting the bottom surface to the main surface;

a plurality of ball bearings received in the respective recesses;

a spherical retaining member received in the cavity and in point-contact with each of the ball bearings and thereby rotatably supported by the ball bearings, the spherical retaining member defining a receiving space therein and an opening in communication with the receiving space;

a camera module received in the receiving space and facing the opening; and a cover comprising a square first portion, a second portion extending from the first portion and engaged in the cavity, and a through hole formed through the first and second portions, with an inner wall of the through hole being spherical; wherein the first portion is engaged in the cutout, with three of side surfaces thereof in contact with the three side surfaces of the cutout and the last side surface thereof exposed to outside; and the spherical retaining member is in contact with the inner wall of the through hole and extends through the through hole.

2. The portable electronic device as described in claim 1, wherein the camera module comprises a holder, a lens module, an image sensor and a circuit board, the holder and the image sensor are mounted to the circuit board, the lens module is mounted to the holder, and the lens module is retained by an inner wall in the opening.

3. The portable electronic device as described in claim 1, wherein the camera module comprises a lens module, an image sensor and a circuit board, a bottom surface of the camera module is in contact with a bottom surface of the receiving space, and side surfaces of the camera module are in contact with side surfaces of the receiving space.

4. A portable electronic device, comprising:
a main body comprising a cavity formed therein, a plurality of recesses formed in inner walls thereof and in communication with the cavity, and a cutout formed in a main surface of the main body and in communication with the cavity;

a plurality of ball bearings received in the respective recesses;

a cover comprising a first portion engaged in the cutout, a second portion extending from the first portion and engaged in the cavity, and a through hole formed through the first and second portions, the first portion exposed to an outside of the main body;

a spherical retaining member rotatably received in the cavity, surrounded by and engaged with the ball bearings and extending through the through hole of the cover, the spherical retaining member defining a receiving space therein and an opening in communication with the receiving space; and a camera module received in the receiving space and facing the opening.

5. The portable electronic device as described in claim 4, wherein an inner wall of the through hole is spherical, and an outer surface of the spherical retaining member is in contact with the inner wall of the through hole.

6. The portable electronic device as described in claim 4, wherein the cutout comprises a bottom surface parallel with the main surface and three side surfaces connecting the bottom surface to the main surface, the first portion is square and comprises a bottom surface in contact with the bottom surface of the cutout and four side surfaces, with three of the four side surfaces in contact with the three side surfaces of the cutout and the last of the four side surfaces exposed to the outside of the main body.

7. The portable electronic device as described in claim 4, wherein the camera module comprises a holder, a lens module, an image sensor and a circuit board, the holder and the image sensor are mounted to the circuit board, the lens module is mounted to the holder, and the lens module is retained by an inner wall of the opening.

8. The portable electronic device as described in claim 4, wherein the camera module comprises a lens module, an image sensor and a circuit board, a bottom surface of the camera module is in contact with a bottom surface of the receiving space, and side surfaces of the camera module are in contact with side surfaces of the receiving space.

9. A portable electronic device comprising:
a main body comprising an outer surface, a cavity defined in the outer surface, an inner wall in the cavity, a plurality of recesses defined in the inner wall and in communication with the cavity, and a cutout formed in the outer surface and in communication with the cavity, the cutout comprising a bottom surface parallel with the outer surface and three side surfaces connecting the bottom surface to the outer surface, and each of the recesses having a spherical inner surface;

a plurality of ball bearings received in and spherically surface contacting the respective recesses;

a retaining member having a spherical configuration, the retaining member rotatably received in the cavity, the ball bearings surrounding and in point-contact with the retaining member to support the retaining member, the retaining member defining a receiving space therein and an opening in communication with the receiving space;

a camera module received in the receiving space and having an image sensor facing the opening; and a cover comprising a square first portion, a second portion extending from the first portion and engaged in the cavity, and a through hole formed through the first and second portions, with an inner wall of the through hole being spherical; wherein the first portion is engaged in the cutout, with three of side surfaces thereof in contact with the three side surfaces of the cutout and the last side surface thereof exposed to outside; and the retaining member is in contact with the inner wall of the through hole and extends through the through hole.

10. The portable electronic device as described in claim 1, wherein each of the recesses has a spherical inner surface to spherically surface contact the corresponding one of the ball bearings.

11. The portable electronic device as described in claim 4, wherein each of the recesses has a spherical inner surface to spherically surface contact the corresponding one of the ball bearings.

12. The portable electronic device as described in claim 1, wherein the receiving space is spherical.

13. The portable electronic device as described in claim 1, wherein the spherical retaining member comprises a bottom surface and a plurality of side surfaces formed in the receiving space.

14. The portable electronic device as described in claim 4, wherein the receiving space is spherical.

15. The portable electronic device as described in claim 4, wherein the spherical retaining member comprises a bottom surface and a plurality of side surfaces formed in the receiving space.

16. The portable electronic device as described in claim 9, wherein the receiving space is spherical.

17. The portable electronic device as described in claim 9, wherein the retaining member comprises a bottom surface and a plurality of side surfaces formed in the receiving space.

* * * * *